United States Patent
Pokharna et al.

(10) Patent No.: US 7,269,005 B2
(45) Date of Patent: Sep. 11, 2007

(54) PUMPED LOOP COOLING WITH REMOTE HEAT EXCHANGER AND DISPLAY COOLING

(75) Inventors: Himanshu Pokharna, San Jose, CA (US); Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/719,803

(22) Filed: Nov. 21, 2003

(65) Prior Publication Data

US 2005/0111183 A1    May 26, 2005

(51) Int. Cl.
*H05K 7/20* (2006.01)
(52) U.S. Cl. .................... 361/687; 361/700
(58) Field of Classification Search .......... 361/681, 361/683, 687, 699, 704, 706, 707, 712–714, 361/717–719
See application file for complete search history.

(56) References Cited

U.S. PATENT DOCUMENTS

| | | |
|---|---|---|
| 3,394,736 A | 7/1968 | Pearson |
| 3,456,319 A | 7/1969 | Gier, Jr. |
| 4,063,823 A | 12/1977 | Grat |
| 4,084,213 A | 4/1978 | Kirchner et al. |
| 4,171,015 A | 10/1979 | Bucey et al. |
| 4,302,793 A | 11/1981 | Rohner |
| 4,350,026 A | 9/1982 | Klein |
| 4,498,851 A | 2/1985 | Kolm et al. |
| 4,688,147 A * | 8/1987 | Ono ........................... 361/699 |
| 4,694,659 A | 9/1987 | Shelton |
| 4,765,395 A | 8/1988 | Paeye et al. |
| 4,780,062 A | 10/1988 | Yamada et al. |
| 4,834,619 A | 5/1989 | Walton |
| 4,881,376 A | 11/1989 | Yonezawa et al. |
| 4,923,000 A | 5/1990 | Nelson |
| 4,966,226 A | 10/1990 | Hamburgen |
| 4,976,117 A | 12/1990 | Crozat et al. |
| 4,980,848 A | 12/1990 | Griffin et al. |
| 5,008,582 A | 4/1991 | Tanuma et al. |
| 5,021,679 A | 6/1991 | Fairbanks et al. |
| 5,095,404 A | 3/1992 | Chao |
| 5,104,626 A | 4/1992 | Yang |
| 5,119,215 A | 6/1992 | Marks et al. |
| 5,146,354 A | 9/1992 | Plesinger |
| 5,153,535 A | 10/1992 | Fairbanks et al. |
| 5,161,389 A | 11/1992 | Rockenfeller et al. |
| 5,247,374 A | 9/1993 | Terada |
| 5,255,109 A * | 10/1993 | Klein ........................... 349/84 |
| 5,255,351 A | 10/1993 | Takanashi et al. |
| 5,255,526 A | 10/1993 | Fischer |
| 5,263,537 A | 11/1993 | Plucinski et al. |

(Continued)

FOREIGN PATENT DOCUMENTS

EP        0 641 155        7/1994

(Continued)

*Primary Examiner*—Jayprakash Gandhi
*Assistant Examiner*—Anthony Q Edwards
(74) *Attorney, Agent, or Firm*—Blakely, Sokoloff, Taylor & Zafman LLP (57) ABSTRACT

A notebook computer system that utilizes both natural convection and forced convection cooling methods is described. Specifically, at low power levels, the forced convection components are disabled to conserve energy and to reduce noise.

12 Claims, 7 Drawing Sheets

U.S. PATENT DOCUMENTS

| | | |
|---|---|---|
| 5,285,351 A | 2/1994 | Ikeda |
| 5,294,831 A | 3/1994 | Azar et al. |
| 5,304,846 A | 4/1994 | Azar et al. |
| 5,307,003 A | 4/1994 | Fairbanks et al. |
| 5,311,402 A | 5/1994 | Kobayashi et al. |
| 5,313,362 A | 5/1994 | Hatada et al. |
| 5,325,265 A | 6/1994 | Turlik et al. |
| 5,329,993 A | 7/1994 | Ettehadieh |
| 5,331,508 A | 7/1994 | Hosoi et al. |
| 5,383,340 A | 1/1995 | Larson et al. |
| 5,394,936 A | 3/1995 | Budelman |
| 5,396,775 A | 3/1995 | Rockenfeller et al. |
| 5,441,576 A | 8/1995 | Bierschenk et al. |
| 5,456,081 A | 10/1995 | Chrysler et al. |
| 5,463,879 A | 11/1995 | Jones |
| 5,477,706 A | 12/1995 | Kirol et al. |
| 5,502,582 A | 3/1996 | Larson et al. |
| 5,552,960 A | 9/1996 | Nelson et al. |
| 5,556,377 A | 9/1996 | Rosen et al. |
| 5,606,341 A | 2/1997 | Aguilera |
| 5,612,852 A | 3/1997 | Leverault et al. |
| 5,613,523 A | 3/1997 | Klawuhn et al. |
| 5,627,412 A | 5/1997 | Beard |
| 5,641,424 A | 6/1997 | Ziolo et al. |
| 5,646,820 A | 7/1997 | Honda et al. |
| 5,704,212 A | 1/1998 | Erler et al. |
| 5,718,282 A | 2/1998 | Bhatia et al. |
| 5,724,818 A | 3/1998 | Iwata et al. |
| 5,742,341 A | 4/1998 | Ohishi et al. |
| 5,752,011 A | 5/1998 | Thomas et al. |
| 5,763,951 A | 6/1998 | Hamilton et al. |
| 5,774,331 A | 6/1998 | Sach |
| 5,781,409 A * | 7/1998 | Mecredy, III ............... 361/687 |
| 5,822,187 A | 10/1998 | Garner et al. |
| 5,832,987 A | 11/1998 | Lowry et al. |
| 5,847,925 A * | 12/1998 | Progl et al. ................. 361/687 |
| 5,855,119 A | 1/1999 | Pfister et al. |
| 5,910,883 A | 6/1999 | Cipolla et al. |
| 5,914,856 A | 6/1999 | Morton et al. |
| 5,966,286 A | 10/1999 | O'Connor et al. |
| 5,969,939 A | 10/1999 | Moss et al. |
| 5,974,557 A | 10/1999 | Thomas et al. |
| 6,008,986 A | 12/1999 | Mok |
| 6,028,768 A | 2/2000 | Cipolla |
| 6,038,128 A | 3/2000 | Hood et al. |
| 6,043,978 A | 3/2000 | Mody et al. |
| 6,058,009 A | 5/2000 | Hood, III et al. |
| 6,082,623 A | 7/2000 | Chang |
| 6,105,662 A | 8/2000 | Suzuki |
| 6,109,039 A | 8/2000 | Hougham et al. |
| 6,111,749 A | 8/2000 | Lamb et al. |
| 6,118,654 A | 9/2000 | Bhatia |
| 6,123,145 A | 9/2000 | Glezer et al. |
| 6,133,631 A * | 10/2000 | Belady ....................... 257/714 |
| 6,134,104 A | 10/2000 | Mohi et al. |
| 6,134,667 A | 10/2000 | Suzuki et al. |
| 6,141,214 A | 10/2000 | Ahn |
| 6,155,073 A | 12/2000 | Gray |
| 6,181,554 B1 | 1/2001 | Cipolla et al. |
| 6,181,555 B1 * | 1/2001 | Haley et al. ................. 361/687 |
| 6,191,943 B1 | 2/2001 | Tracy |
| 6,216,235 B1 | 4/2001 | Thomas et al. |
| 6,226,178 B1 | 5/2001 | Broder et al. |
| 6,252,769 B1 | 6/2001 | Tullstedt et al. |
| 6,255,622 B1 | 7/2001 | May et al. |
| 6,263,689 B1 | 7/2001 | Dodge et al. |
| 6,269,865 B1 | 8/2001 | Huang |
| 6,275,945 B1 | 8/2001 | Tsuji et al. |
| 6,288,895 B1 | 9/2001 | Bhatia |
| 6,288,896 B1 * | 9/2001 | Hsu ............................ 361/687 |
| 6,304,450 B1 | 10/2001 | Dibene, II et al. |
| 6,310,436 B1 | 10/2001 | Ge et al. |
| 6,316,872 B1 | 11/2001 | Ge et al. |
| 6,338,257 B1 | 1/2002 | Chiu et al. |
| 6,347,034 B1 | 2/2002 | Holmburg |
| 6,349,553 B1 | 2/2002 | Pfister et al. |
| 6,357,515 B1 | 3/2002 | Bhatia |
| 6,397,931 B1 | 6/2002 | Lin et al. |
| 6,397,932 B1 | 6/2002 | Calaman et al. |
| 6,397,935 B1 | 6/2002 | Yamamoto et al. |
| 6,408,937 B1 | 6/2002 | Roy |
| 6,415,612 B1 | 7/2002 | Pokharna et al. |
| 6,432,320 B1 | 8/2002 | Bonsignore et al. |
| 6,441,874 B1 | 8/2002 | Saito et al. |
| 6,447,692 B1 | 9/2002 | Momoda et al. |
| 6,453,378 B1 | 9/2002 | Olson et al. |
| 6,463,396 B1 | 10/2002 | Nishigaki |
| 6,487,668 B2 | 11/2002 | Thomas et al. |
| 6,493,440 B2 | 12/2002 | Gromatzky et al. |
| 6,501,654 B2 | 12/2002 | O'Connor et al. |
| 6,504,720 B2 | 1/2003 | Furuya |
| 6,510,052 B2 * | 1/2003 | Ishikawa et al. ............ 361/687 |
| 6,525,935 B2 | 2/2003 | Casebolt |
| 6,529,377 B1 | 3/2003 | Nelson et al. |
| 6,535,266 B1 | 3/2003 | Nemeth et al. |
| 6,535,798 B1 | 3/2003 | Bhatia et al. |
| 6,567,269 B2 | 5/2003 | Homer et al. |
| 6,588,497 B1 | 7/2003 | Glezer et al. |
| 6,595,006 B2 | 7/2003 | Thiesen et al. |
| 6,606,251 B1 | 8/2003 | Kenny, Jr. et al. |
| 6,611,425 B2 | 8/2003 | Ohashi et al. |
| 6,625,028 B1 | 9/2003 | Dove et al. |
| 6,629,425 B2 | 10/2003 | Vaiyapuri |
| 6,631,077 B2 | 10/2003 | Zuo |
| 6,650,542 B1 | 11/2003 | Chrysler et al. |
| 6,657,121 B2 * | 12/2003 | Garner ....................... 174/16.3 |
| 6,669,451 B1 | 12/2003 | Wall |
| 6,727,824 B1 * | 4/2004 | Miseli et al. ............... 340/689 |
| 6,729,383 B1 | 5/2004 | Cannell et al. |
| 6,729,480 B1 | 5/2004 | Blake |
| 6,746,212 B2 | 6/2004 | Payne |
| 6,795,311 B2 | 9/2004 | Pokharna et al. |
| 6,819,566 B1 | 11/2004 | Danovitch et al. |
| 6,900,990 B2 * | 5/2005 | Tomioka ..................... 361/752 |
| 6,903,929 B2 | 6/2005 | Prasher et al. |
| 2002/0012231 A1 | 1/2002 | Bhatia et al. |
| 2002/0087901 A1 | 7/2002 | Cooper et al. |
| 2002/0087903 A1 | 7/2002 | Hermerding et al. |
| 2002/0141152 A1 | 10/2002 | Pokharna et al. |
| 2003/0043544 A1 | 3/2003 | Nelson et al. |
| 2003/0062149 A1 | 4/2003 | Goodson et al. |
| 2003/0075311 A1 | 4/2003 | Seaba et al. |
| 2003/0109967 A1 | 6/2003 | Cooper |
| 2003/0120960 A1 | 6/2003 | Cooper |
| 2003/0178178 A1 | 9/2003 | Breuer et al. |
| 2003/0209343 A1 | 11/2003 | Bingler |
| 2004/0045749 A1 | 3/2004 | Jaura et al. |
| 2004/0095721 A1* | 5/2004 | Ellsworth et al. ........... 361/694 |
| 2004/0123977 A1 | 7/2004 | Pokharna et al. |
| 2004/0128101 A1 | 7/2004 | Hermerding, II |
| 2004/0182099 A1 | 9/2004 | Hsu |
| 2004/0223299 A1* | 11/2004 | Ghosh ........................ 361/687 |
| 2004/0246247 A1 | 12/2004 | Rossi |
| 2005/0172650 A1 | 8/2005 | Hermerding |

FOREIGN PATENT DOCUMENTS

| | | |
|---|---|---|
| WO | WO 02/080270 | 10/2002 |

* cited by examiner

FIG. 6

PUMPED LOOP COOLING WITH REMOTE HEAT EXCHANGER AND DISPLAY COOLING

FIELD OF THE INVENTION

The present invention pertains to the field of computer system design. More particularly, the present invention relates to a thermal management technology for notebook computers.

BACKGROUND OF THE INVENTION

A computer system typically comprises a plurality of electronic components. Such components may include a central processing unit (CPU), a chipset, and a memory. During operation, the components dissipate heat. In addition, voltage stepping inside the computing system also generates heat. If the CPU, or any other electronic component, becomes overheated, performance may suffer and the component's life may be depreciated.

A thermal management system is typically used to remove heat from a computer system. One example of a thermal management system is a single-phase loop. In a single-phase loop, a liquid is used to absorb and remove heat from a component of a computer system. The liquid is then circulated to an area of the system where the heat is purged through natural convection.

A second example of a thermal management system is a refrigeration loop. A refrigeration loop typically uses a working fluid such as Freon to cool a component of a system. An evaporator picks up heat from the component. The heat causes the working fluid to change phase from a liquid to a mixture of liquid and vapor or pure vapor. A pump, working as a compressor, then transports the working fluid to a heat exchanger. The compressor compresses or increases the pressure of the gas, which results in increase in temperature of the fluid. The heat exchanger is typically coupled to a fan that rejects the heat from the working fluid to the ambient air, turning the working fluid back into a liquid. The liquid, however, is still at a high pressure. An expansion valve reduces the pressure of the working fluid and returns the working fluid to the evaporator to complete the loop.

A third example of a thermal management system is a two-phase cooling loop. Like a refrigeration loop, a two-phase cooling loop also uses a pump to circulate a working fluid to cool a component of a system. A two-phase loop typically uses a working fluid such as water. An evaporator picks up heat from the component. Within the evaporator, the heat causes the working fluid to form a vapor. The working fluid is output from the evaporator to a heat exchanger, condenser, or heat sink. The heat exchanger is typically coupled to a fan that rejects the heat from the working fluid to the ambient air. The vapor condenses in the heat exchanger, converting the working fluid back to liquid. A pump is used to drive the working fluid to the evaporator to complete the loop. The fundamental difference between the refrigeration loop and the two-phase loop is that the heat exchanger in the refrigeration loop typically has a higher temperature than the heat exchanger in the two-phase loop.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
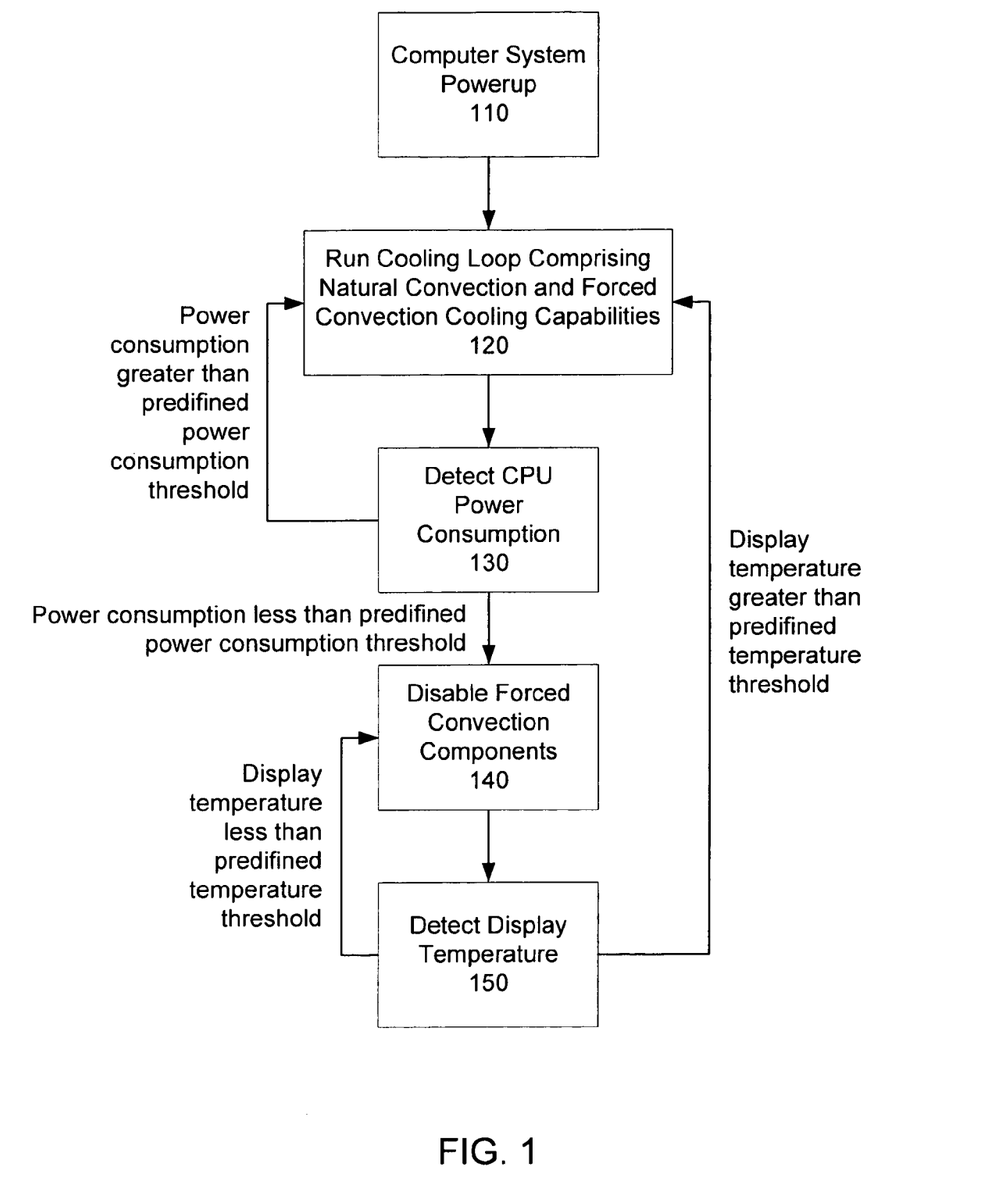
FIG. 1 is a flowchart of a cooling loop having natural convection and forced convection cooling capabilities.

Most applications of a notebook computer system consume only a few watts of power. Computer systems generally rely on forced convection methods that use a remote heat exchanger and fan to dissipate the heat generated by these applications. FIG. 1 is an embodiment of a flowchart of a notebook computer system that comprises both natural convection and forced convection cooling capabilities. The computer boots in operation 110. A cooling loop comprising natural convection and forced convection is enabled in operation 120. This cooling loop and its components will be described in further detail below. A circuit then detects the power consumption or temperature of the CPU in operation 130. If the power consumption by the CPU or the temperature of the CPU is greater than a predefined threshold, the cooling loop continues to cool the system through natural convection and forced convection.

If, however, the circuit in operation 130 detects that the power consumption by the CPU or the temperature of the CPU is less than the predefined threshold, the forced convection components of the cooling loop are disabled in operation 140. In other words, the fan is turned off, but the fluid continues to flow through the heat exchanger. The forced convection components may comprise a remote heat exchanger and a fan.

If natural convection is primarily performed through the display of the notebook computer system, the display temperature is detected in operation 150. The cooling loop may rely solely on this natural convection method as long as the temperature is less than a predefined temperature threshold. Otherwise, if the temperature is detected to be greater than a predefined temperature threshold, the forced convection components are enabled.

Figure 2:
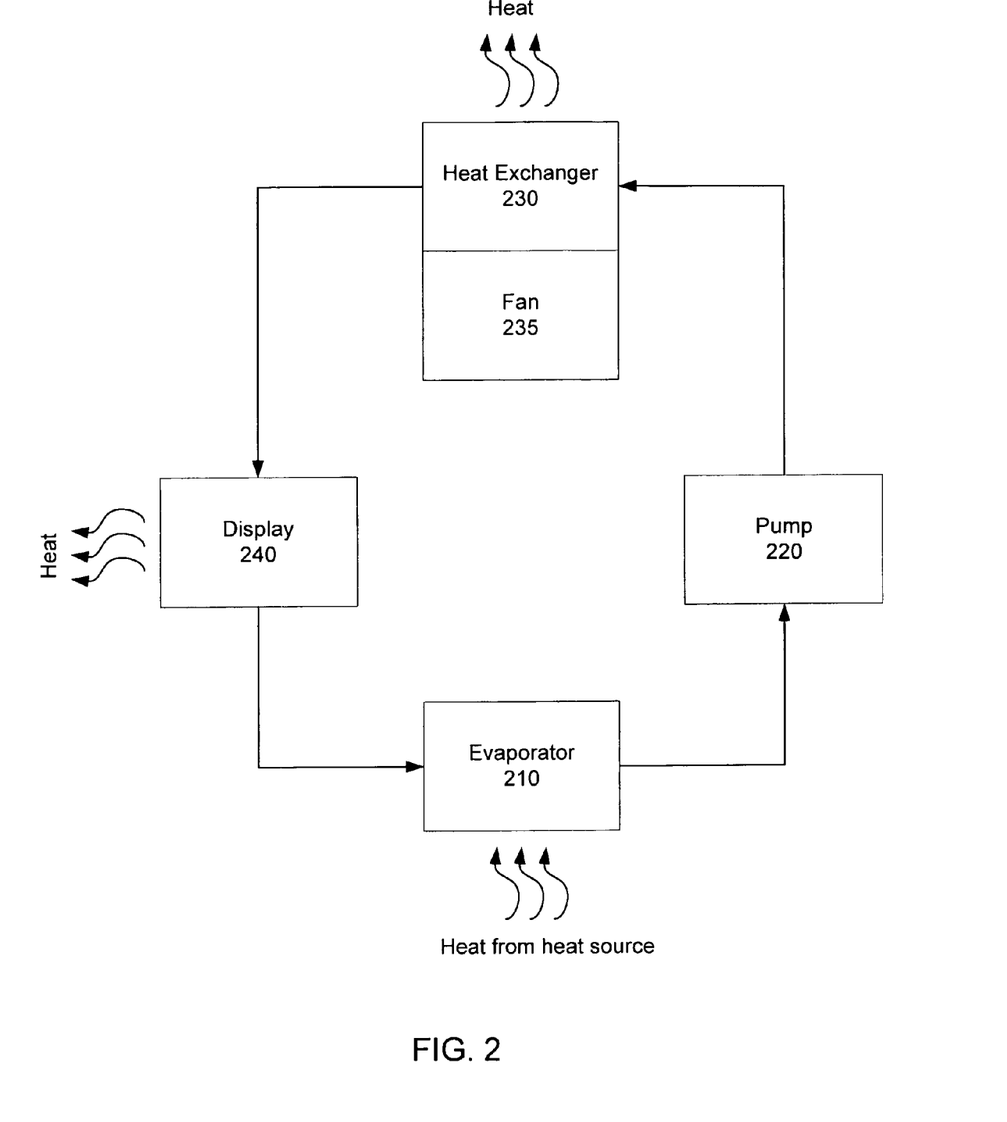
FIG. 2 is an embodiment of a refrigeration loop with remote heat exchanger and display to dissipate heat.

The flowchart described in FIG. 1 may be implemented in a refrigeration loop or a pumped liquid loop. Moreover, the flowchart is independent of the working fluid used to cool the computer system. FIG. 2 depicts an example of how a system having natural convection and forced convection cooling capabilities may be implemented in a refrigeration loop.

The refrigeration loop of FIG. 2 comprises evaporator 210, compressor or pump 220, heat exchanger 230, fan 235, and display 240. Evaporator 210 is coupled to pump 220 and display 240. Pump 220 is coupled to heat exchanger 230. Heat exchanger 230 is coupled to fan 235 and display 240.

The evaporator 210 is thermally coupled to a heat source. As an example, the evaporator 210 may be placed on top of a heat source. For one embodiment of the invention, the heat source may be the CPU of the notebook computer system. The evaporator 210 picks up heat from the heat source, heating the working fluid.

Figure 2A:
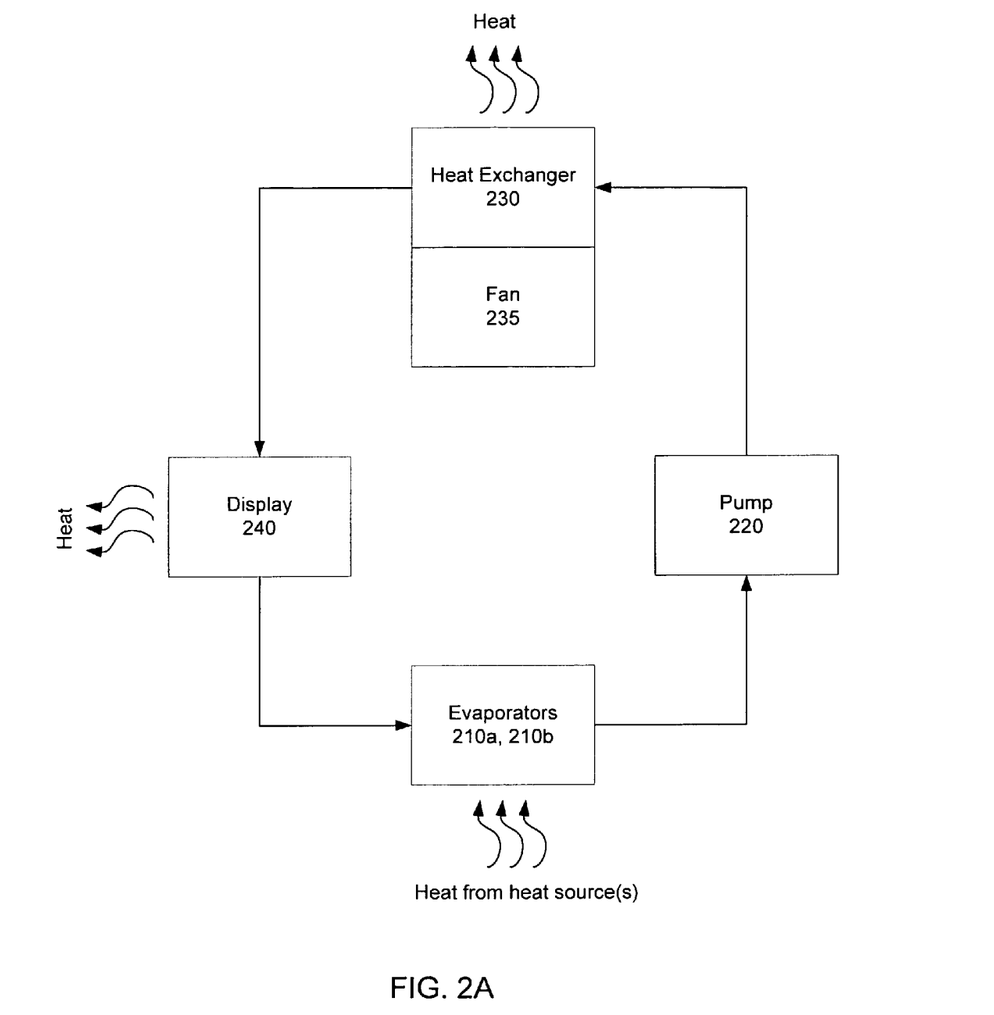
FIG. 2A is an embodiment of a refrigeration loop with a plurality to evaporators to dissipate heat.

For another embodiment of the invention, the notebook computer system may comprise a plurality of evaporators 210a and 210b, as shown in FIG. 2A. The use of a plurality of evaporators allows heat to be absorbed by the working fluid at a number of components. Each evaporator is placed at a heat sensitive component of the notebook computer system.

The working fluid changes phase inside the evaporator 210. Prior to reaching the evaporator 210, the working fluid comprises a liquid phase. As the working fluid picks up heat at the evaporator 210, the working fluid may boil and form a vapor. Thus, after picking up heat from the heat source, the working fluid comprises a liquid phase and a vapor phase. The pump 220 is coupled to the evaporator 210 and pumps the working fluid exiting the evaporator 210 to the heat exchanger 230.

Inside the heat exchanger 230 or condenser, the heat in the working fluid is rejected via fan 235 to the ambient air and the vapor condenses. This heat rejection via forced convection from the fan 235 is a first heat sink the computer system.

The second heat sink is the notebook display 240, which is coupled to the heat exchanger 230. The display 240 allows for natural convection. The display 240 will be described in further detail in FIG. 4.

The cooling system of FIG. 2 offers improved cooling capabilities over traditional refrigeration or two-phase loops because the cooling system of FIG. 2 comprises a plurality of heat sinks. Moreover, the cooling system may offer improved performance. The forced convection components may be turned off when the system and its applications are generating a minimum amount of energy. As stated above, most applications consume only a few watts of power on average. The display 240 may dissipate 2-20 watts of power through natural convection and radiation. This heat sink should be sufficient for the execution of most applications on the notebook computer system. For one embodiment of the invention, the remote heat exchanger 230 and the fan 235 are only enabled when a high power application is being executed. Thus, the fan 235 is turned on to enable forced convection as soon as the load is larger than the system's natural convection cooling capabilities.

For another embodiment of the invention, heat sensors are placed at a plurality of heat sensitive components of the notebook computer system. The heat sensors may be thermal diodes. The notebook computer system monitors the temperature at each of the heat sensors. The remote heat exchanger 230 and the fan 235 are enabled when the computer system detects the temperature at a component is greater than a predefined temperature. Otherwise, the notebook computer system cools itself only through passive cooling or natural convection. Therefore, the notebook computer system is normally passively cooled, but active cooling techniques are also enabled if any monitored component exceeds a threshold temperature. Selectively enabling the forced convection components allow the notebook computer system to save energy and to increase the battery life. Further, disabling the fan 235 may reduce noise.

Figure 3:
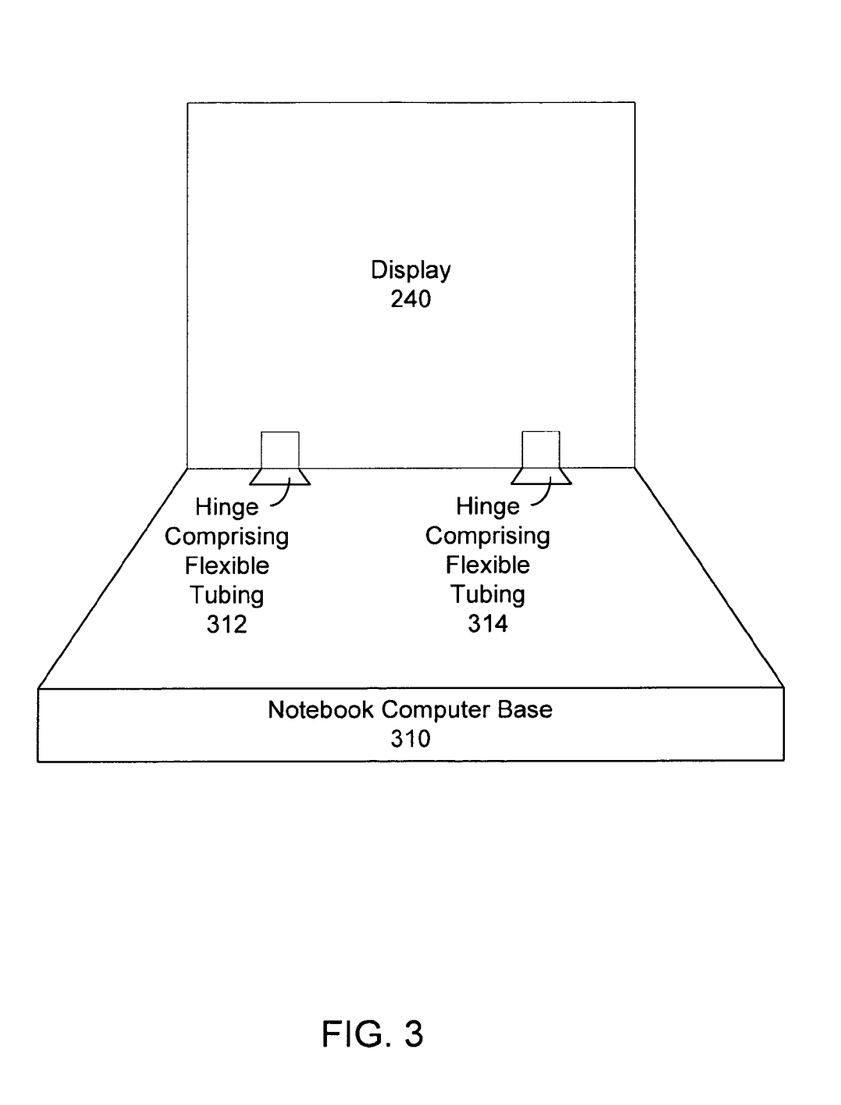
FIG. 3 is an embodiment of a notebook computer system with hinges that comprise flexible tubing to transfer a working fluid.

FIG. 3 depicts a notebook computer system for implementing the flowchart of FIG. 1. The notebook computer base 310 is coupled to hinge 312 and hinge 314. The hinges 312 and 314 are coupled to display 240. Evaporator 210, pump 220, remote heat exchanger 230, and fan 235 may be components of notebook computer base 310. A keyboard may be coupled to the top of the notebook computer base 310. The working fluid of the cooling loop may be transmitted from the notebook computer base 310 to the display 240 via tubing or hoses inside the hinges 312 and 314. The hoses that are inside hinges 312 and 314 are flexible and may be manufactured using plastic if the working fluid remains a single phase during the cooling loop. For example, the hoses may be plastic if the working fluid is liquid metal.

However, working fluids that changes phase in the course of the cooling loop may require the hinges 312 and 314 to comprise metal tubing in order to ensure a hermetic seal. The metal tubing may comprise metallic bellows. Water may be a working fluid that has more than a single phase.

The working fluid is delivered from the computer base 310 to the display 240 because the display 240 comprises a large surface area, which is ideal for natural convection. Natural convection is a function of a temperature gradient and area. Natural convection may be defined by the following equation:

$$Q = h * A * \Delta T,$$

where Q is the heat rejected, h is the heat transfer coefficient, A is the heat rejection surface area, and $\Delta T$ is the difference between the working fluid temperature and the ambient temperature outside of the display 240.

Figure 4:
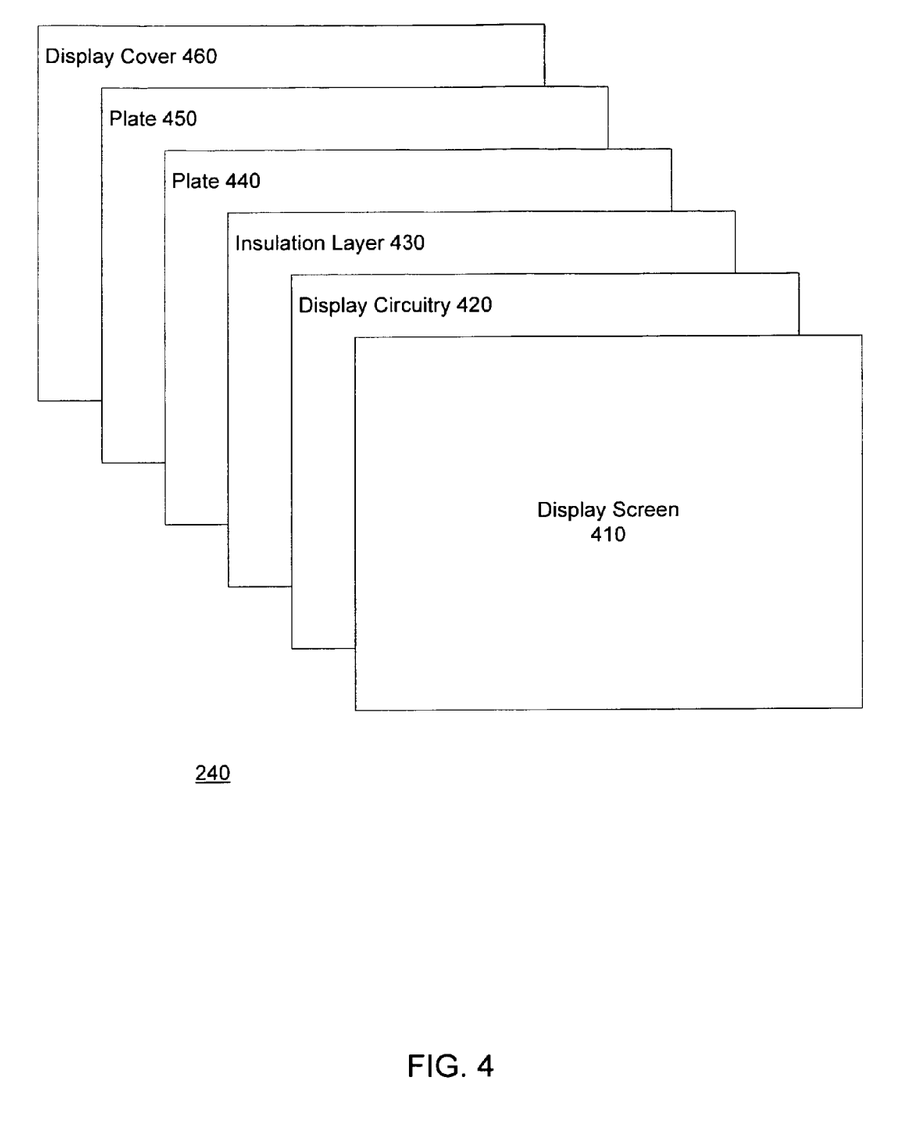
FIG. 4 is an embodiment of a display for cooling a notebook computer system.

The layers of the display 240 are depicted in FIG. 4. Display screen 410 is coupled to display circuitry 420. Display circuitry 420 is coupled to insulation layer 430. Insulation layer 430 is coupled to plate 440. Plate 440 is coupled to plate 450. Plate 450 is coupled to display 460.

The heat transfer coefficient, h, varies depending on properties of the convection surface. In this case, the chosen convection surface is the cover 460 of the notebook display 240. To achieve maximum heat dissipation, the temperature of the working fluid must be as high as possible. The temperature of the working fluid, however, may have two limitations. The first limitation is the reliability criteria of the display screen 410. Display circuitry 420 may comprise components that are heat sensitive. The working fluid temperature may be kept at a temperature that would prevent degradation of the display circuitry 420.

The second limitation of the working fluid temperature is the ergonomic specification of the notebook computer system. The hotter the working fluid temperature, the greater the heat dissipated from the display cover 460. Heat dissipation increases the temperature of the display cover 460. The temperature of the display cover 460 must be maintained such as to prevent the user of the notebook computer system from being burned.

The display circuitry 420 may comprise a sensor to detect the temperature of inside the display. The sensor may be a thermal diode. For one embodiment of the invention, if the forced convection components are disabled and the sensor detects that the temperature of the display screen 410 is above a first predefined threshold, the sensor may enable the forced convection components. For another embodiment of the invention, if the forced convection components are disabled and the sensor detects that the temperature of the display cover 460 is above a second predefined threshold, the sensor may enable the forced convection components.

Figure 5:
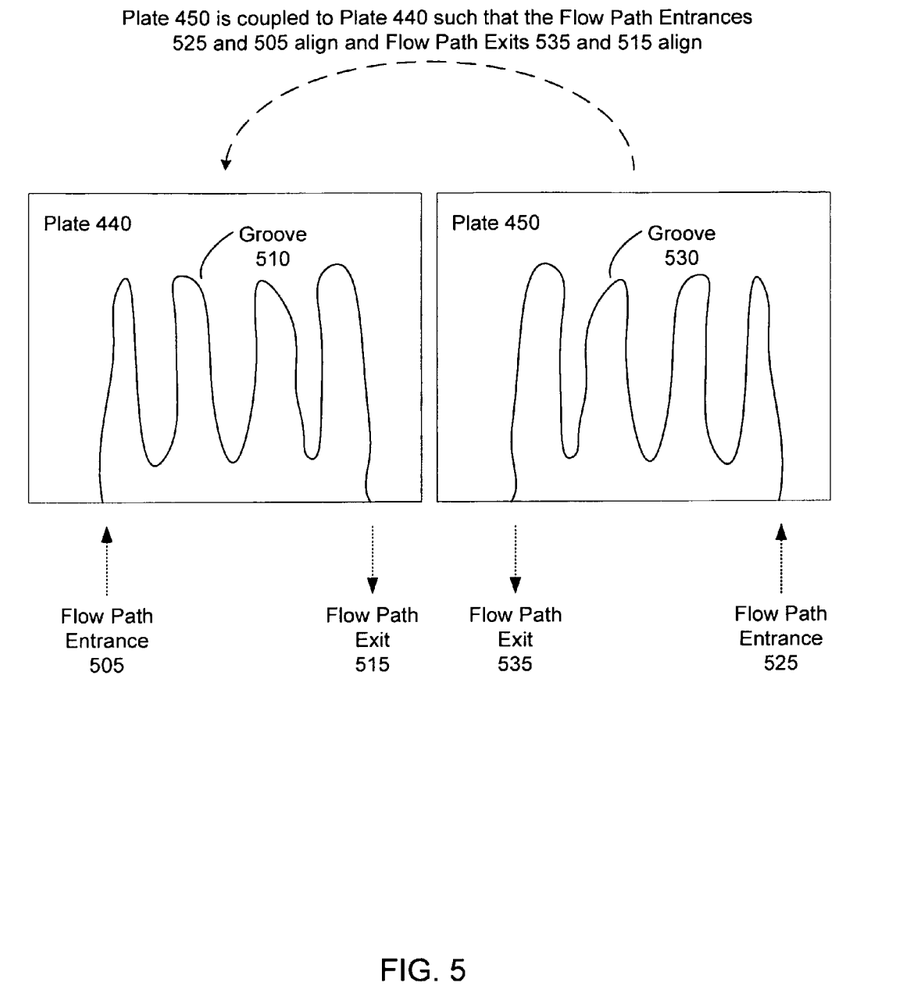
FIG. 5 is an embodiment of plates in a notebook computer system display.

The working fluid is kept between plate 440 and plate 450 of the notebook display 240. FIG. 5 depicts an embodiment of the face of plates 440 and 450. The plates 440 and 450 have complementary features with regard to one another. Plate 440 comprises a groove 510, flow path entrance 505, and flow path exit 515. Plate 450 comprises a groove 530, flow path entrance 525, and flow path exit 535.

The face of plate 450 is superimposed on the face of plate 440 such that the groove 530 aligns with groove 510, flow path entrance 525 aligns with flow path entrance 505, and flow path exit 535 aligns with flow path exit 515. In other words, plate 450 is flipped over onto plate 440. The grooves in the plates 440 and 450, once placed together, form a pipe like path. Each of the plates 440 and 450 are each approximately one millimeter thick. The plates 440 and 450 may be manufactured using a metal such as aluminum or copper. The material of the plates 440 and 450, however, must not be a material that negatively reacts with the working fluid.

The groove 510 of plate 440 and the groove 530 of plate 450 provide a flow path for the working fluid. The working fluid enters the grooves at flow path entrances 505 and 525 and exit at flow path exits 515 and 535. The flow path allows the temperature of the working fluid to be spread across the surface area of the display 240. The more turns the grooves 510 and 530 of plates 440 and 450, the better the temperature spreading. The temperature spreading creates a natural convection of heat that escapes through the display cover 460. The display cover 460 may be manufactured using a plastic. Alternatively, the display cover 460 may be manufactured using a metallic material such as magnesium.

To protect the display circuitry 420 from the working fluid heat, an insulating layer 430 may be placed between the display circuitry 420 and the plate 440. The insulating layer 430, however, is only required if the working fluid may reach a temperature hotter than the display circuitry 420 tolerance specification.

Figure 6:
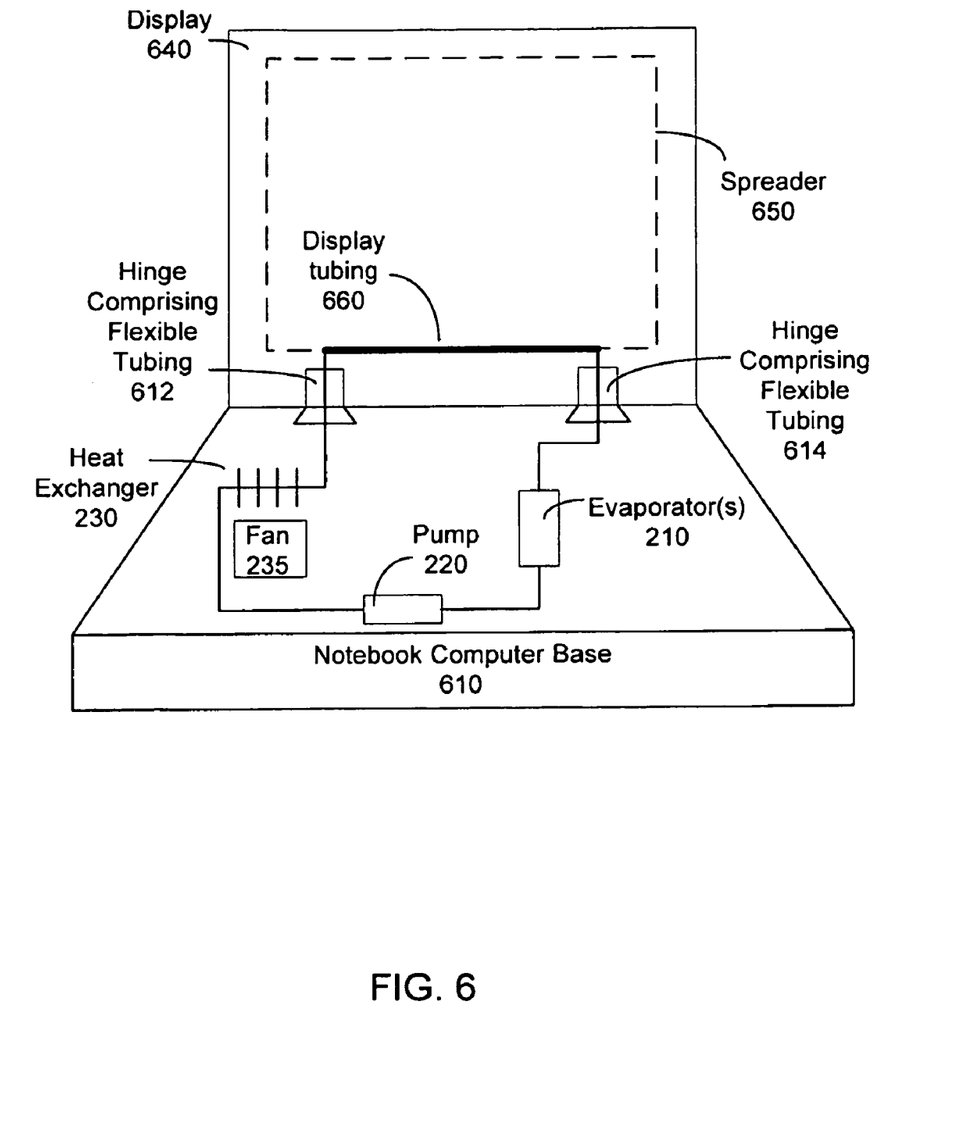
FIG. 6 is an embodiment of a notebook computer system having a spreader to distribute heat in the display.

FIG. 6 depicts another embodiment of the invention for implementing the flowchart of FIG. 1. FIG. 6 depicts a notebook computer system having a notebook computer base 610, hinges 612 and 614, and display 640. The notebook computer base 610 is coupled to hinge 612 and hinge 614. The hinges 612 and 614 are coupled to display 640. One or more evaporators 210, pump 220, remote heat exchanger 230, and fan 235 may be components of notebook computer base 610. The fan 235 may be enabled if cooling through natural convection is insufficient. A keyboard may be coupled to the top of the notebook computer base 610. Similar to the computer system of FIG. 3, the working fluid of the cooling loop may be transmitted from the notebook computer base 610 to the display 640 via tubing or hoses inside the hinges 612 and 614.

The display 640 comprises display tubing 660 and spreader 650 to provide natural convection. The display tubing 660 is coupled to the hoses in hinges 612 and 614. For one embodiment of the invention, the working fluid may be flow from hinge 612 to display tubing 660. The working fluid may then exit the display via hinge 614. The spreader 650 may be a flat heat pipe or a roll bond heat pipe coupled to the display tubing 660. The spreader 650 spreads the temperature of the working fluid across the display 640 to create a natural convection of heat that escapes through the display cover.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A thermal management system of a notebook computer system, comprising:
   a plurality of heat generating components comprising a display circuitry and a central processing system (CPU);
   a plurality of evaporators coupled to the components to remove heat from the components, wherein the heat is transported via a working fluid; and
   a pump coupled to the evaporators to transport the working fluid from the evaporators to a heat exchanger, wherein a fan removes heat from the working fluid in the heat exchanger if at least one of the heat generating components exceeds a predefined temperature threshold; and
   a display coupled to at least one of the evaporators, wherein the working fluid is spread across the surface area of the display to dissipate heat.

2. The thermal management system of claim 1, wherein the display dissipates approximately 2-20 watts of power.

3. The thermal management system of claim 1, further comprising:
   a hinge to transfer the working fluid from the heat exchanger to the display, wherein the hinge comprises flexible tubing.

4. The thermal management system of claim 3, wherein the hinge comprises metal tubing to provide a hermetic seal.

5. The thermal management system of claim 1, wherein the working fluid comprises water.

6. A thermal management system, comprising:
   means for cooling a notebook computer system passively;
   means for detecting a temperature of a plurality of notebook computer system components, wherein the components comprise a display circuitry and a central processing system (CPU);
   means for removing heat from the components through a display using a plurality of evaporators coupled to the components;
   means for pumping a working fluid through the notebook computer system; and
   means for cooling the notebook computer system actively if a component of the computer system exceeds a threshold temperature.

7. The thermal management system of claim 6, further comprising:
   means for increasing a life of a battery of the notebook computer system.

8. The thermal management system of claim 6, further comprising:
   means for spreading a working fluid temperature across a display of the notebook computer system.

9. A method, comprising:
   dissipating heat from a notebook computer system through a display of a notebook computer system;
   monitoring a temperature of the notebook computer system components, wherein the components comprise a display circuitry and a central processing system (CPU); and
   dissipating heat from the notebook computer system by using a plurality of evaporators coupled to the components to remove heat from the components, wherein the heat is transported via a working fluid, a pump coupled to the evaporators to transport the working fluid to a heat exchanger, and a fan to remove heat from the heat exchanger if the notebook computer system detects at least one of the components of the notebook computer system exceeds a predefined temperature threshold.

10. The method of claim 9, further comprising:
monitoring a power consumption of a central processing unit (CPU).

11. The method of claim 10, further comprising:
disabling the fan if the power consumption of the CPU is less than a predefined power threshold.

12. The method of claim 9, wherein the display comprises a screen, circuitry, and a cover, wherein heat passively dissipates through the display cover.

* * * * *